Feb. 19, 1963   J. J. IHNACIK, JR   3,077,954
DISC BRAKE
Filed July 14, 1959   3 Sheets-Sheet 3

JOSEPH J. IHNACIK JR.
INVENTOR.

BY John R. Faulkner
Clifford L. Sadler
ATTORNEYS

United States Patent Office 3,077,954
Patented Feb. 19, 1963

3,077,954
DISC BRAKE
Joseph J. Ihnacik, Jr., Detroit, Mich., assignor to Ford Motor Company, Dearborn, Mich. a corporation of Delaware
Filed July 14, 1959, Ser. No. 827,092
2 Claims. (Cl. 188—73)

The present invention relates to braking devices and more specifically to disc brakes for motor vehicles.

Hydraulically actuated disc brakes for motor vehicles are well known in the art particularly those types in which relatively small friction pieces are hydraulically pressed against a radial disc attached to the vehicle's road wheel. As compared with the more conventional internal shoe brake in which a pair of shoes are expanded against a cylindrical drum, the area of brake lining in contact with the brake disc is relatively small and thus extremely high lining loads or unit pressures to effect the braking action are required. As a result, on an ordinary polished brake disc surface, the rubbing action of the lining excites the disc producing an audible response. If the natural frequency of the lining is close to the natural frequency of the disc, resonance and undesirable noise will result from the vibration. Such a situation is not uncommon.

Therefore, in view of the foregoing state of the art, is is the principal object of the present invention to provide an improved braking disc which will not vibrate with an audible response.

It is a further object of the present invention to provide a circumferentially spaced apart series of outwardly extending slots in the rim of a brake disc that will interrupt the continuity of the disc surface and thus provide a self-dampening action which will suppress most disc brake noises such as squealing and chatter. The slots provided are also adapted to change the resonant frequency of the disc to some valve substantially different than the frequency of the lining and other components of the braking system.

These and further objects of the present invention will become apparent from the following description and the accompanying drawings in which.

Figure 1:
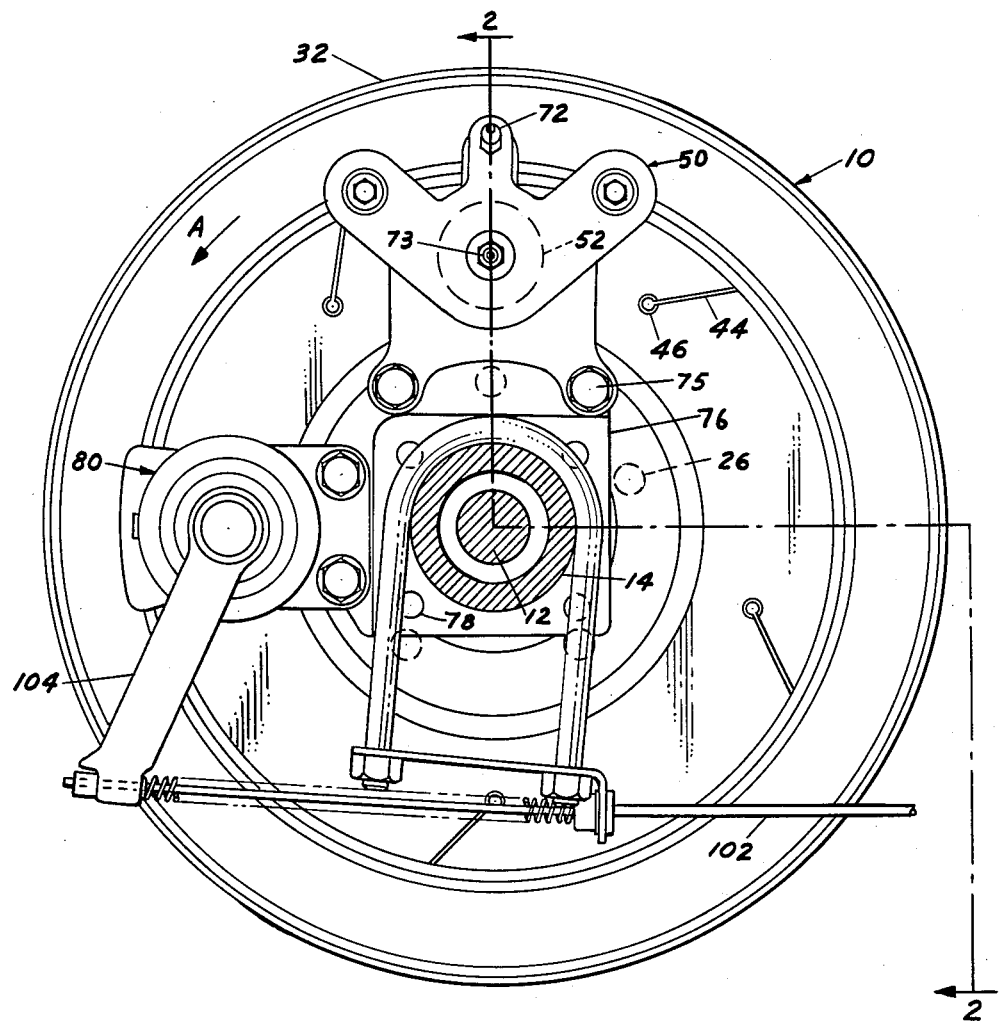
FIGURE 1 is an elevational view of a disc brake incorporating the preferred embodiment of my invention.

Referring now to the drawings for a detailed description of the present invention wherein like reference numerals identify like parts throughout the various figures, a wheel assembly incorporating a disc brake is shown in FIGURE 1 and is indicated generally by the reference numeral 10. The present invention is shown incorporated in the rear wheel of a motor vehicle although it is obviously understood that it is equally adaptable to the front wheels of a vehicle.

Wheel assembly 10 includes a rotatable axle 12 and a coaxial axle housing 14. Axle 12 has a wheel hub 16 affixed thereto and is supported for rotation motion within housing 14 by anti-friction bearings such as ball bearing 18. Hub 16 has a radially extending flange portion 20 to which is attached an annular structural piece 22 that forms a support for the outer race of bearing 18. It also forms a support for the inside diameter of a hat-shaped brake disc 24. The disc 24 and structure 22 are secured to the radial flange 20 by appropriate means such as studs 26. The studs 26, in association with nuts 28 threadably received thereon, contain and support the inwardly directed radial flange 30 of a conventional rubber tire carrying wheel 32.

Figure 3:
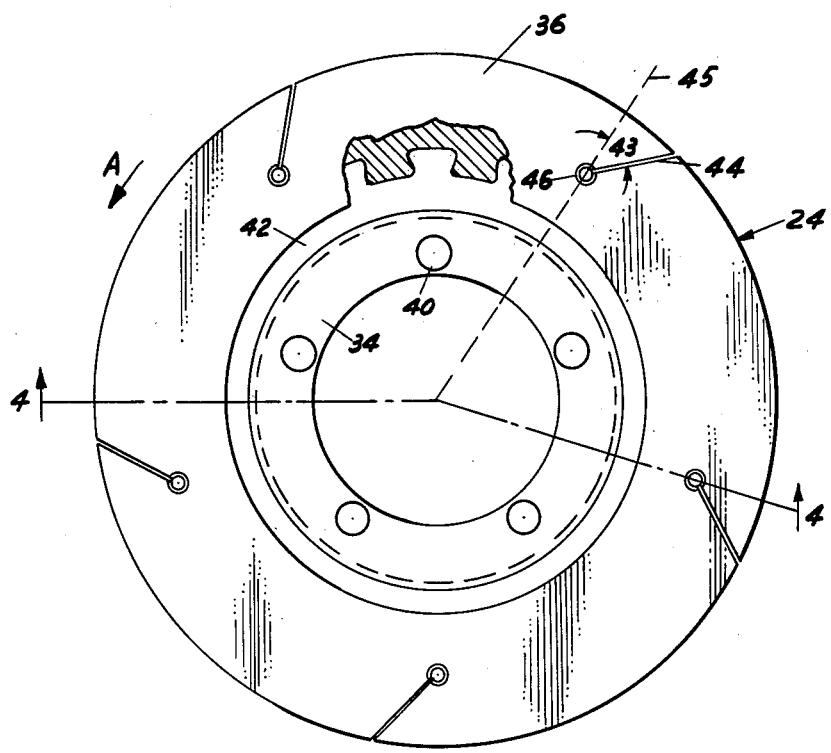
FIGURE 3 is an elevational view of the braking disc.
Figure 4:
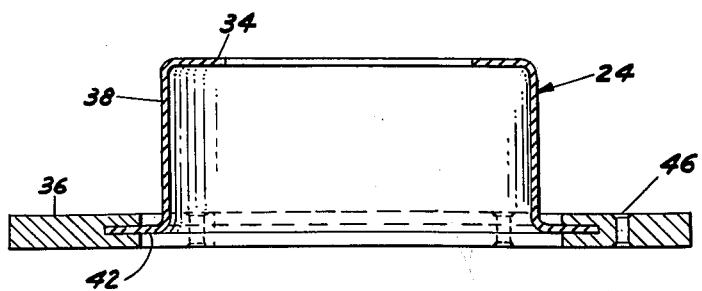
FIGURE 4 is a sectional view taken along section lines 4—4 of FIGURE 3.

As previously stated the brake disc 24 is of a generally hat-shaped configuration having an inner radial flange 34 that is axially offset from an outwardly extending radial braking surface or rim 36 by means of an interconnecting cylindrical portion 38. The inner radial flange 34 is provided with a bolt circle 40 to complement the aforementioned studs 26 for the retention of the braking disc to the wheel structure. The rim 36 of the disc 24 is in the present embodiment shown to be of cast iron construction and several times greater in thickness than the thickness of the inner portions such as 32 and 38 of the disc 24. Brake disc 24 is of a two-part construction comprising a sheet metal stamping which forms the inner flange 34, the cylindrical extension 38 and a radial portion 42 to which the cast iron rim 36 is attached. It will be noted from the cut-away portion of the disc 24 as shown in FIGURE 3 that flange 42 is provided with an irregular or multi-dovetail peripheral edge to which the cast iron rim 36 of the braking disc 24 becomes attached when it is cast in place.

The cast iron rim 36 of the disc 24 is also provided with a series of outwardly extending slots 44 which are arranged at an angle 43 to a true radial line 45 of the disc 24. The inner ends of the slots 44 terminate in holes 46 which extend axially through the rim 36. The radius of the centers of the circumferentially arranged series of holes 46 is greater than the outer radius of the flange 42. The angle 43 as shown in FIGURE 3 is provided so that when the disc 24 is rotated in what constitutes a forward vehicle direction as indicated by the arrow A, the slots 44 trail away from or lag the direction of motion. While the exact quantity of angle 43 may be varied within reasonable limits and still render satisfactory operation, it was found that an angle of 45° in one particular physical embodiment produced particularly acceptable results.

Referring back to FIGURE 2, a hydraulically actuated brake assembly 50 is disclosed that has a pair of opposed frictional brake lining pieces 52 and 53 disposed on opposite sides of the rim 36 of the disc 24. The linings 52 and 53 are circular in shape and are contained in cylindrical bores 54 and 56 of a housing 58 which forms a part of the brake actuating mechanism 50. The brake linings 52 and 53 are formed of hard friction materials such as compositions of asbestos and are backed by members 60 and 62 that form pistons within the cylindrical bores 54 and 56. Spring pressed seals 64 and 66 are provided on the outer ends of the pistons 60 and 62.

Communicating with the bores 54 and 56 are a pair of hydraulic passageways 68 and 70 that have a common hydraulic fitting 72 to which the hydraulic pressure line of the vehicle's service brake system is attached. Passageways 68 and 70 communicate with the outer ends of pistons 60 and 62 respectively and permit the application of fluid pressure to their outer face to force the friction surfaces of the linings 52, 53 against the rim piece 36 of the braking disc 24. A pair of annular seals 74 provided about the linings 52, 53 to prevent the leakage of hydraulic fluid. A fitting 73 is provided for purposes of bleeding entrapped air from the hydraulic system in accordance with practices that are well known in the art.

Assembly 50 is joined to the axle housing 14 by a bolted connection at 75 to bracket 76 which, in turn, is bolted to the axle housing by a series of bolts 78.

Operation of the hydraulically actuated disc service brake is instituted by applying hydraulic fluid pressure from the service brake system through fitting 72 from whence it communicates through passageways 68 and 70 to the outer faces of pistons 60, 64 which forces the linings 52 and 53 in gripping action against opposite faces of the rim 36 of the braking disc 24.

Figure 2:
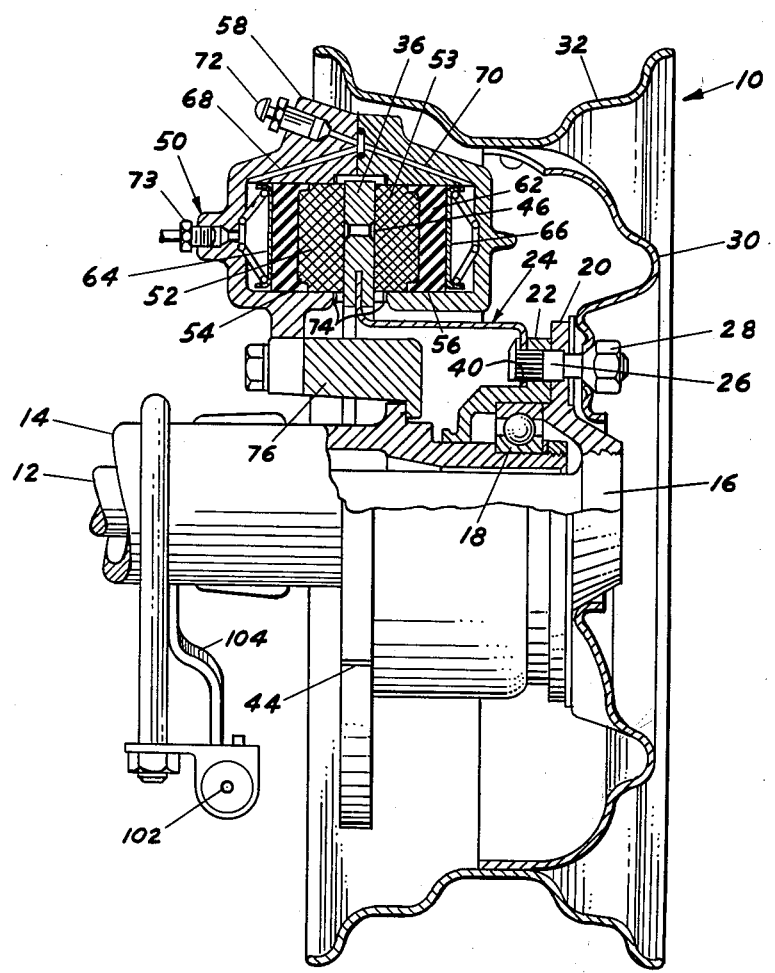
FIGURE 2 is a sectional view taken along section lines 2—2 of FIGURE 1.

It will be noted from FIGURE 2 that the distance of the linings 52, 53 from the axis of the disc 24 is less than the radius of the circle that contains the centers of holes 46 that form the inner termination of the slots 44 in the rim 36 of the brake disc 24. Thus as the brake linings 52 and 53 are held against the radial faces of rim 36 and the linings 52, 53 and rim 36 are in sliding contact as the disc 24 rotates, the linings 52, 53 will first come in contact with the holes 46. If, as a result of heat distortion, there is any axial displacement of the periphery of the rim 36 at circumferentially adjacent portions on either side of one of the slots 44, then such misalignment will not create a chattering action as the two brake linings 52 and 53 pass across the slot 44. This is a result of the fact that the linings 52, 53 first engage the holes 46 and then the innermost portion of the slots 44 where any axial displacement is at a minimum. In effect the passage of the rim 36 between the opposed linings 52 and 53 causes a wiping action which tends to draw adjacent portions of the rim 36 on either side of the slot 44 into alignment. By way of contrast, if the slots 44 were truly radial, the linings 52 and 53 would strike the edge of the slots abruptly which would cause undue wear of the lining and create vibration in the disc.

It is the purpose of these nonradial slots to reduce vibration and noise in the application of disc brakes by interrupting the continuity of the braking surface which not only provides a self-dampening action that will suppress most disc brake noises such as squeal and chatter but also change the natural frequency of the disc so that it may be controlled to be other than the natural frequency of other components of the braking system. It is often a phenomenon in disc brake systems that the natural frequency of the lining is close to the natural frequency of the disc which results in an audible resonance resulting in undesirable noise when the vehicle brakes are applied. The slots 44 prevent the resonant condition and because they are not radial reduce brake chatter as well as wear of the brake linings 52, 53.

In FIGURE 2 a mechanically actuated parking brake assembly 80 is disclosed in part which is energized by means of a cable 82 and a lever 84. Brake 80 contains a pair of opposed brake linings (not shown) which are similar in configuration to linings 52 and 53. Therefore, the application of the mechanical brake 80 will also be noise and chatter free due to its similarity in construction to the service brake assembly 50. The linings of the parking brake 80 engage the rim 36 in the same manner as the linings 52 and 53.

The foregoing constitutes the preferred embodiment of the present invention; however, modifications may occur to those skilled in the art which will fall within the scope and spirit of the following claims.

I claim:

1. A brake device for a motor vehicle having in combination a rotatable ground wheel, a hat-shaped brake disc affixed to rotate with said wheel, actuatable means adapted to hold said disc against rotation, said means comprising at least one pair of opposed circularly shaped brake disc engaging friction members, said disc having an enlarged annular rim portion, said rim having a circumferentially arranged series of outwardly extending slots formed therethrough at an angle of approximately 45° to the radius of said rim and lagging the normal forward direction of rotation of said disc, a hole passing through said rim at the inner terminus of said slot and the distance between the axis of rotation of said disc and hole being greater than the distance between said axis and nearest edge of said friction members.

2. A brake device for a motor vehicle having in combination a rotatable wheel, a brake disc affixed to rotate with said wheel, actuatable means adapted to hold said disc against rotation, said means comprising at least one pair of opposed brake disc engaging friction members, said disc comprising a circumferentially arranged series of outwardly extending slots formed therethrough at a material angle to the radius of said disc and lagging the normal forward direction of rotation of said disc, and the distance between the axis of rotation of said disc and the inner terminus of said slots being greater than the distance between said axis and nearest edge of said friction members.

References Cited in the file of this patent

UNITED STATES PATENTS

| | | |
|---|---|---|
| 384,268 | Nelson | June 12, 1888 |
| 2,308,604 | Goodwin | Jan. 19, 1943 |
| 2,693,261 | Winther | Nov. 2, 1954 |
| 2,738,044 | Winther | Mar. 13, 1956 |
| 2,835,351 | Armstrong et al. | May 20, 1958 |
| 2,987,143 | Culbertson et al. | June 6, 1961 |

FOREIGN PATENTS

| | | |
|---|---|---|
| 706,050 | Great Britain | Mar. 24, 1954 |